United States Patent [19]
Oku et al.

[11] Patent Number: 5,594,527
[45] Date of Patent: Jan. 14, 1997

[54] NEGATIVE FILM MASKING APPARATUS

[75] Inventors: Hiroshi Oku; Eiji Motooka, both of Wakayama, Japan

[73] Assignee: Noritsu Koki Co., Ltd., Wakayama, Japan

[21] Appl. No.: 424,650

[22] Filed: Apr. 19, 1995

[30] Foreign Application Priority Data

Apr. 20, 1994 [JP] Japan .................. 6-081485

[51] Int. Cl.⁶ .......................... G03B 27/62; G03B 27/52
[52] U.S. Cl. ................. 355/75; 355/40; 355/41
[58] Field of Search ............... 355/40, 41, 72, 355/74, 75

[56] References Cited

U.S. PATENT DOCUMENTS

| | | | |
|---|---|---|---|
| 4,189,228 | 2/1980 | Farrell | 355/41 |
| 4,455,082 | 6/1984 | Lepist | 355/75 |
| 4,933,716 | 7/1990 | Imamura et al. | 355/75 |
| 4,994,850 | 2/1991 | Imamura et al. | 355/41 |
| 5,285,237 | 2/1994 | Parulski et al. | 355/75 |
| 5,453,817 | 9/1995 | Oka et al. | 355/75 |

*Primary Examiner*—Arthur T. Grimley
*Assistant Examiner*—Herbert V. Kerner
*Attorney, Agent, or Firm*—Wenderoth, Lind & Ponack

[57] ABSTRACT

A negative film masking apparatus for use in printing of a negative film has patterns of latent image data recorded thereon outside of frames and is held between a negative holder and a mask cover for an exposure operation. A view window is provided in one of either of the negative holder and the mask cover to allow each desired one of the latent image patterns of the negative film to be viewed. A light emitter is mounted on the other of the negative holder and the mask cover opposite to the view window.

11 Claims, 4 Drawing Sheets

NEGATIVE FILM MASKING APPARATUS

BACKGROUND OF THE INVENTION

The present invention relates to an improvement of a negative film masking apparatus.

Up-to-date negative films have recorded thereon latent image data in the form of bar codes including film manufacturers and ISO sensitivity numbers. Also, other identity data including film manufacturer logos, film types, and frame numbers are written on the negative films in a visible mode and are used for a printing process. The latent image data are stored outside of the frames on the films and when loaded in a negative masking apparatus will no longer be viewed.

For adjusting a desired frame of a negative film to an exposure gate position in a reprinting process, there is needed either a sequence of counting a number of frames from a starting frame to a desired frame and loading and advancing the negative film to the gate position by such number, or advancing directly to the gate position the desired frame, the number of which has been identified and memorized.

It will be understood however that the counting of the frames often produces a mistaken count. If two adjacent frames on a negative film have a similar appearance, they will hardly be distinguished from each other by viewing by an operator while their latent image data is not in view.

It is an object of the present invention, in view of the above predicament, to provide a negative film masking apparatus capable of identifying and reading data of latent images recorded outside of frames on a negative film.

SUMMARY OF THE INVENTION

A negative film masking apparatus according to the present invention for use in printing of a negative film which has patterns of latent image data recorded thereon outside of frames and designed to be held between a negative holder and a mask cover for an exposure operation, includes a view window provided in one of either of the negative holder and the mask cover for allowing each desired one of the latent image patterns of the negative film to be viewed and a light emitter mounted on the other of the negative holder and the mask cover opposite to the view window. When the negative film is loaded between the negative holder and the mask cover, each desired one of its latent image data patterns is placed between the view window and the light emitter. As a result, the latent image data pattern when illuminated by the light emitter easily can be viewed by an operator of the apparatus.

The negative film masking apparatus may allow the light emitter to be switched on when the latent image pattern is being viewed and off when an exposure operation is started. Since the light emitter is turned off during the exposure operation, the exposure operation action or measurement of optical density of the negative film never is disturbed. The negative film is increased in contrast at the brightly painted color back plate, thus allowing its latent image patterns to be read with ease.

DETAILED DESCRIPTION OF THE PREFERRED EMBODIMENTS

Embodiment 1

Figure 1:
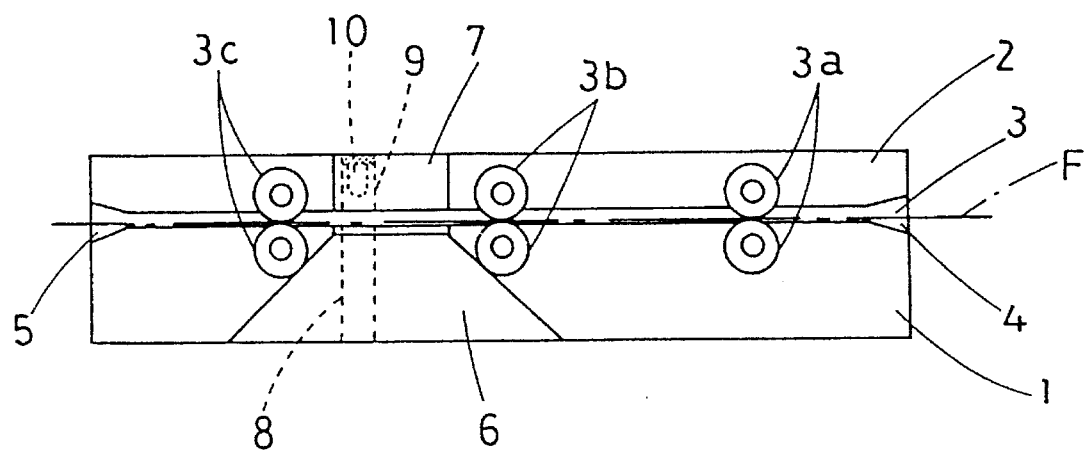
FIG. 1 is a front view of an embodiment of a negative masking apparatus of the present invention.
Figure 2:
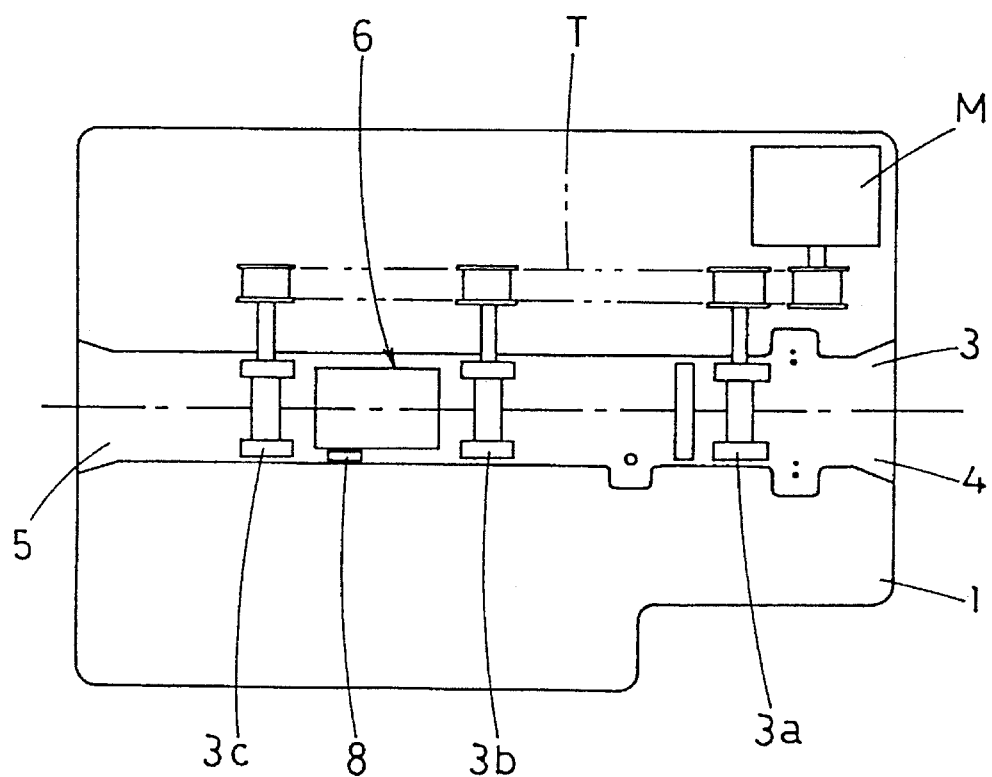
FIG. 2 is a plan view of such negative masking apparatus.

A negative film masking apparatus comprises negative holder 1 and a mask cover 2. The negative holder 1 has a film transfer path 3 for transferring a negative film F from a transfer inlet 4 to a transfer outlet 5 (FIGS. 1 and 2).

The negative film F has patterns of latent image data (not shown) recorded thereon outside of frames, each pattern being assigned to a frame of the film. The latent image pattern carries relevant data such as ISO sensitivity numbers while other identity data including film manufacturer logos, film types, and frame numbers are written in a visible mode on the film F.

There are also provided a pair of rollers 3a adjacent to the transfer inlet 4 of the transfer path 3, a pair of rollers 3b on the inlet 4 side of an exposure station 6 including a gate in negative holder 1, and a pair of rollers 3c on the outlet 5 side of station 6. The rollers 3a, 3b, and 3c are driven via a transmission means T by a motor M for synchronous rotating movements. As the motor M rotates, the negative film F is transferred frame-by-frame along the path 3 from the transfer inlet 4 to the transfer outlet 5 (FIGS. 1 and 2). The exposure station or gate 6 is located at an intermediate point of the transfer path 3. The mask cover 2 has a masking opening 7 provided therein opposite to the exposure gate 6 of the negative holder 1.

A view window 8 is provided in the negative holder 1 adjacent to the exposure gate 6. In operation, when a target frame of the negative film F is advanced to the exposure gate 6, its latent image pattern is viewed through the window 8 (FIGS. 1 and 2). The mask cover 2 has a mounting hole 9 provided therein opposite to the view window 8 of the negative holder 1. A light emitter 10 is installed in the mounting hole 9 (FIG. 1). The view window 8 may be in the form of either a through hole or a notch.

The light emitter 10 is switched off automatically or manually when a density measurement or an exposure operation of he negative film F is started. Illumination of emitter 10 is activated automatically or manually by a controller means (not shown) for allowing the latent image patterns on the film F to be identified and read. Accordingly, the illuminating action of the light emitter 10 for reading of the latent image patterns on the film F will never be permitted to disturb the density measurement and the exposure operation. The light emitter 10 is an LED or small-sized lamp for illuminating the negative film F and thus providing sufficient contrast to enable an operator looking through view window 8 to view and read the patterns of latent image data of film F.

Figure 3:
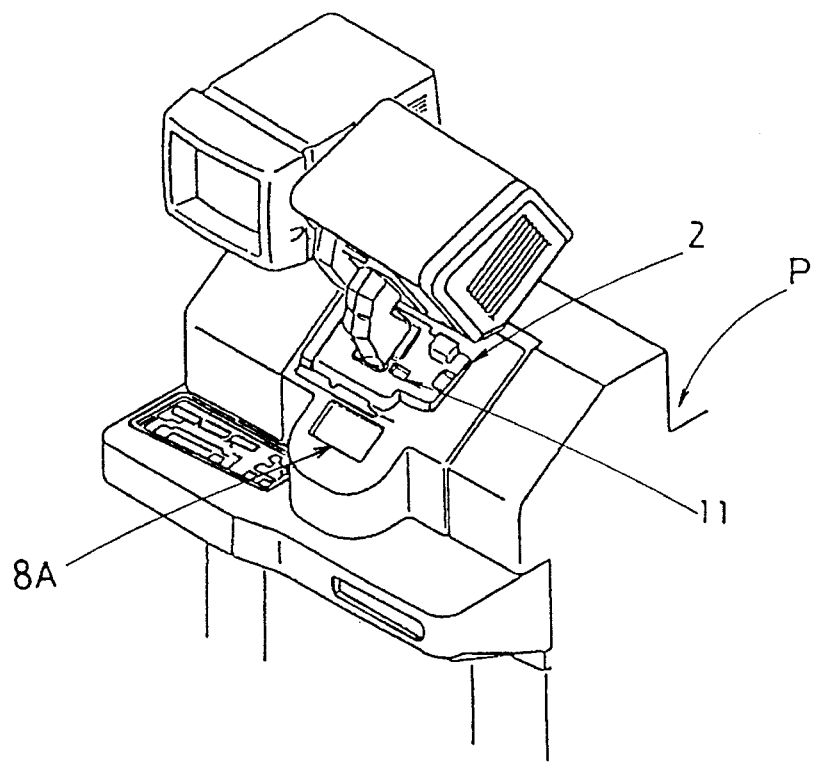
FIG. 3 is a perspective view of a printer provided with the negative masking apparatus of the present invention.

FIG. 3 is a perspective view of a printer P in which denoted by 11 is a print size detecting aperture for allowing an operator to examine whether a frame of interest following a preceding frame located in the exposure gate 6 is of standard format or of panoramic format. The print size detecting aperture 11 is so located in the mask cover 2 that it allows an unexposed region of the frame of interest to be viewed together with the latent image pattern of the same when the frame is of panoramic format.

In operation, the frame of interest is judged to be of panoramic format when its unexposed region is viewed through the print size detecting aperture 11. Otherwise, it is determined to be of standard format when only an exposed region of the frame appears in the aperture 11. In either case, the latent image pattern of the frame is observed through the print size detecting aperture 11. Accordingly, the print size detecting aperture 11 allows the latent image pattern of a frame of interest on the film F following the preceding frame at the exposure gate 6 to be identified.

Figure 4:
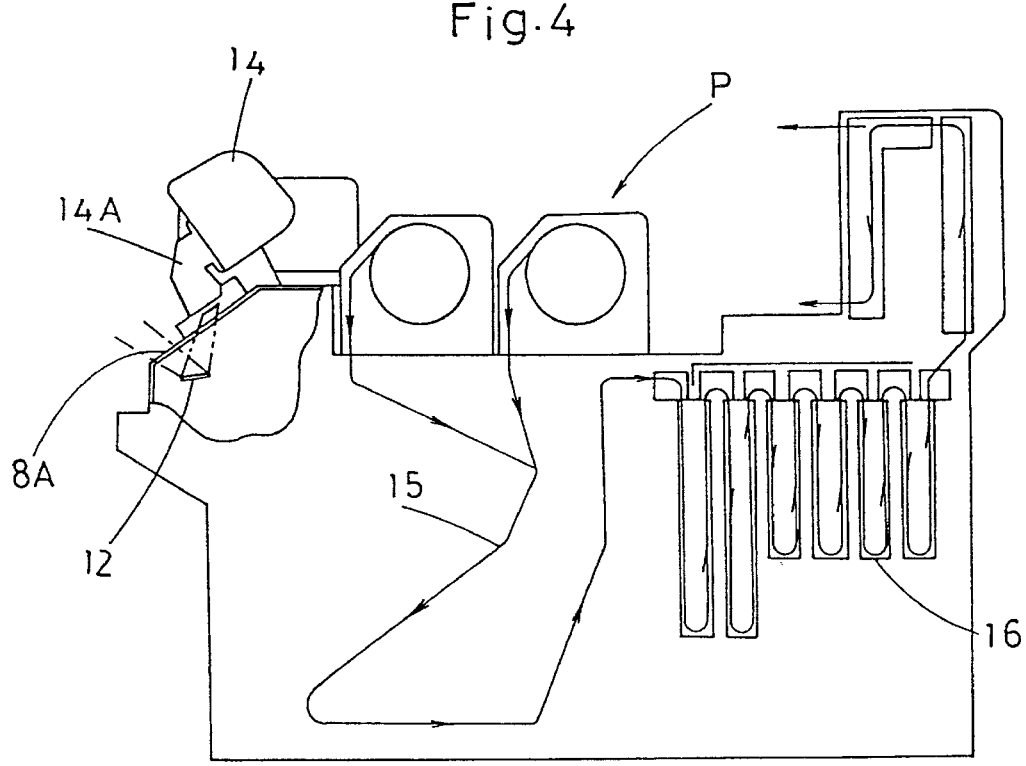
FIG. 4 is a schematic view of a printer provided with the negative masking apparatus of the present invention.

FIG. 4 is a schematic view of the printer P. As shown, a negative film reading mirror 12 is provided on which an optical image of the latent image pattern is projected through the view window 8 by passing across the negative film F a beam of light emitted from the light emitter 10. The optical image of the pattern on the negative film reading mirror 12 is viewed through a negative film viewing window 8A of the printer. A beam of exposure light emitted from an exposure light source 14 is passed through a mirror tunnel 14A and is directed onto the frame of the negative film F held at the exposure gate 6. In turn, an image of the frame is printed on a print paper 15 which is then subjected to a development process at a development station 16. A lens may be mounted between the negative film F and the negative film reading mirror 12 for projecting an enlargement of the latent image pattern on the film F onto the negative film reading mirror 12.

Embodiment 2

Figure 5:
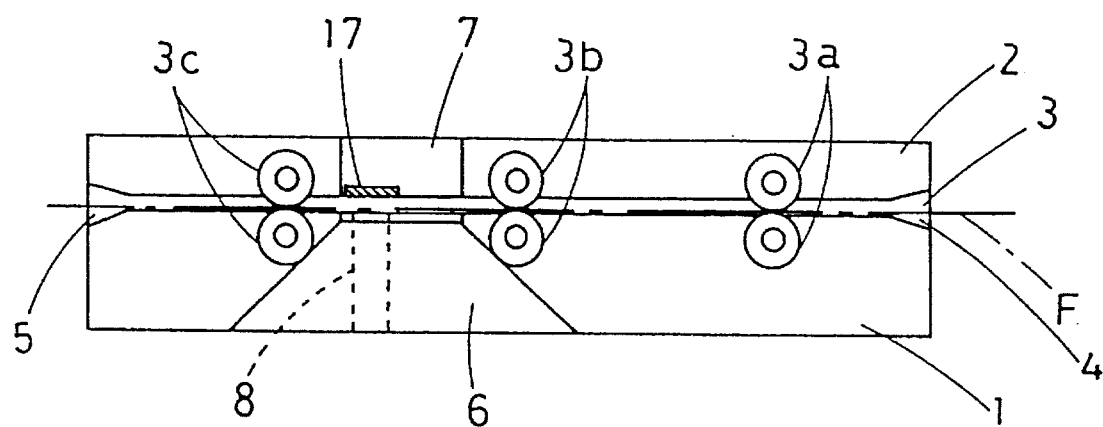
FIG. 5 is a front view of another embodiment of the negative masking apparatus of the present invention.

A view window 8 is provided adjacent to exposure station 6 in negative holder 1. When a target frame of a negative film F is loaded at the exposure station 6, its latent image pattern comes just above the view window 8 (FIG. 5). In place of the light emitter 10, a color back plate 17 painted a highly bright color, e.g. white or a metallic color, is mounted on the mask cover 2 opposite to and covering the view window 8 of negative holder 1. As both the negative holder 1 and the mask cover 2 have a dark color such as black for preventing reflection of light, at least adjacent view window 8 and plate 17, the negative film F at the brightly painted color back plate 17 readily can be distinguished from the dark background, thus providing sufficient contrast to enable an operator looking through view window 8 to view and read patterns of latent image data of film F. The components other than the light emitter 10 are identical to those in Embodiment 1, are denoted by like numerals and will not be explained in further detail.

Embodiment 3

Figure 6:
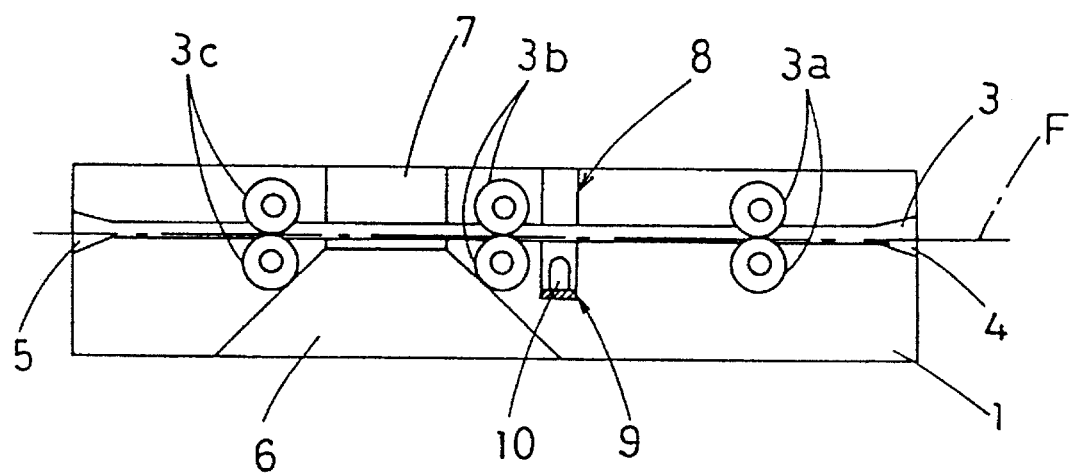
FIG. 6 is a front view of yet another embodiment of the negative masking apparatus of the present invention.

A view window 8 is provided at a location in the mask cover 2 where a succeeding frame of a negative film F (on the inlet side) is placed when a target frame is at the exposure station 6. Also, a mounting hole 9 is provided in negative holder 1 opposite to the view window 8 of the mask cover 2. A light emitter 10 is mounted in the mounting hole 9 (FIG. 6). When the target frame of the negative film F is at the exposure station 6, a latent image pattern of the succeeding frame is viewed through the view window 8 for reading of its data. The other components are identical to those in Embodiment 1, are denoted by like numerals and will not be explained in further detail.

Embodiment 4

Figure 7:
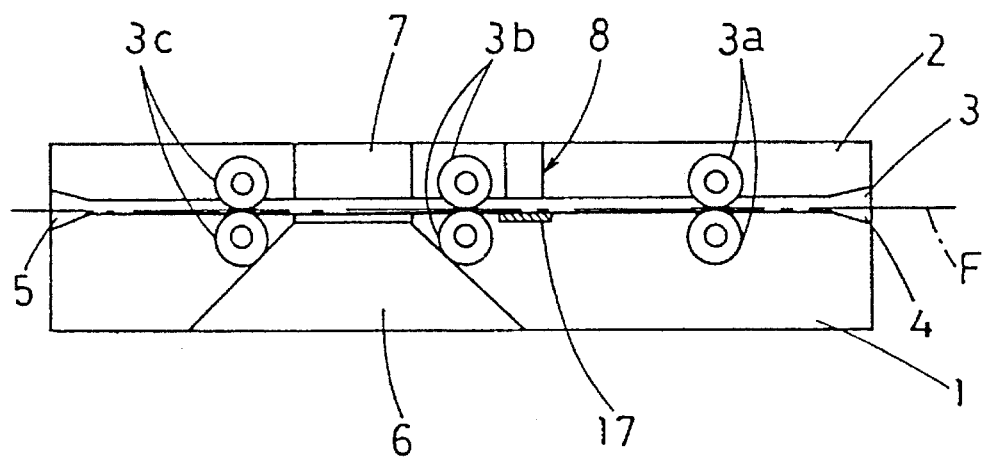
FIG. 7 is a front view of still another embodiment of the negative masking apparatus of the present invention.
Figure 8:
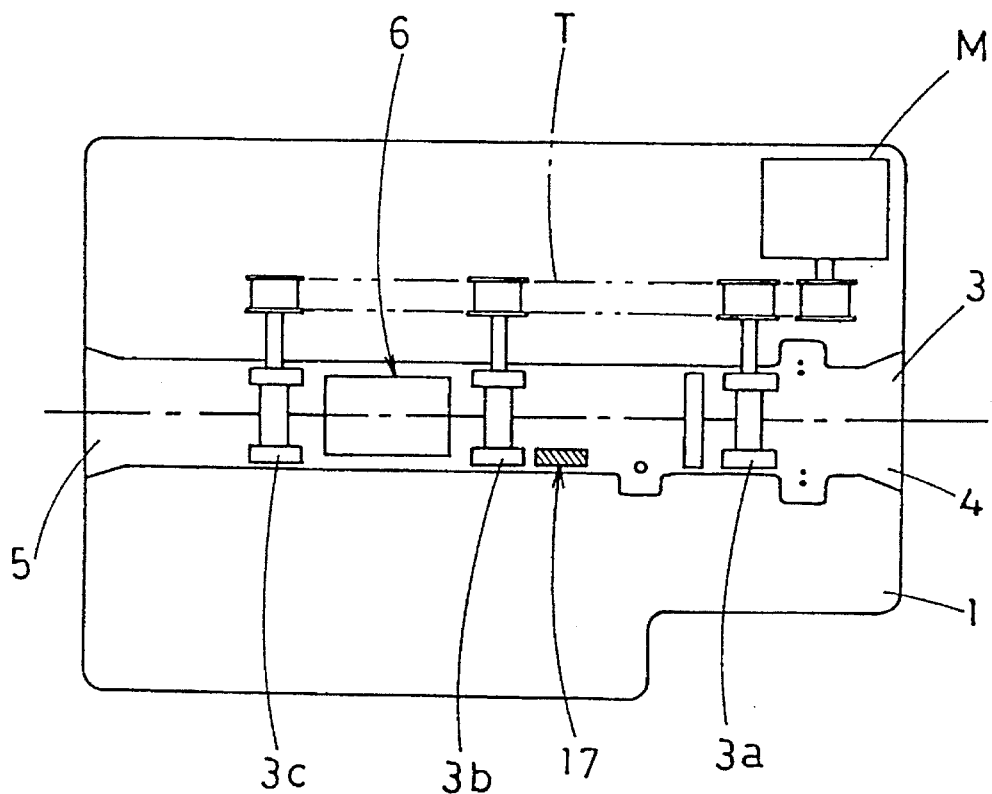
FIG. 8 is a plan view thereof.

A view window 8 is provided at a location in the mask cover 2 where a succeeding frame of a negative film F (on the inlet side) is placed when a target frame is at the exposure station 6 (FIG. 7). In place of the light emitter 10, a color back plate 17 painted a highly bright color, e.g. white or a metallic color, is mounted on negative holder 1 opposite to and covering the view window 8 of the cover 2. As both the negative holder 1 and the mask cover 2 have a dark color such as black for preventing reflection of light, the negative film F at the brightly painted color pack plate 17 readily can be distinguished from the dark background. The other components are identical to those in Embodiment 1, are denoted by like numerals and will not be explained in further detail.

In other embodiments, any combination of the view window 8, light emitter 10, and color back plate 17 may be provided at the outlet 5 side of the exposure station 6.

What is claimed is:

1. A negative film masking apparatus for use in printing a negative film which has patterns of latent image data recorded thereon outside of frames thereof, said apparatus comprising:

a negative holder having an exposure gate at an exposure station and a film transfer path to receive the negative film and along which the negative film may be transferred to bring a frame thereof into alignment with said exposure gate for exposure of such frame;

a mask cover confronting said negative holder to cover the negative film such that the negative film can be held between said negative holder and said mask cover, said mask cover having therein an opening opposite said exposure gate of said negative holder;

a view window provided in one of said negative holder and said mask cover at a position therein enabling an operator of said apparatus to look toward patterns of latent image data adjacent a particular frame of the negative film in said film transfer path; and means, provided in the other of said negative holder and said mask cover at a position thereof opposite said view window, to provide contrast at the patterns of latent image data adjacent the particular frame sufficient to enable the operator to view and read the same.

2. An apparatus as claimed in claim 1, wherein said contrast providing means comprises a light emitter.

3. An apparatus as claimed in claim 2, wherein said light emitter is mounted in a mounting hole in said other of said negative holder and said mask cover.

4. An apparatus as claimed in claim 2, wherein said light emitter comprises an LED or a lamp.

5. An apparatus as claimed in claim 2, wherein said light emitter is operable to be switched off during an exposure operation at said exposure station.

6. An apparatus as claimed in claims 1, wherein said contrast providing means comprises a color back plate of a highly bright color.

7. An apparatus as claimed in claim 6, wherein said negative holder and said mask cover, at least adjacent said view window and said color back plate, are of a dark color sufficient to prevent reflection of light therefrom.

8. An apparatus as claimed in claim 1, wherein said view window is in said negative holder, and said contrast providing means is in said mask cover.

9. An apparatus as claimed in claim 1, wherein said view window is in said mask cover, and said contrast providing means is in said negative holder.

10. An apparatus as claimed in claim 1, wherein said view window and said contrast providing means are located at a position closely adjacent said exposure station, such that the particular frame is a frame located at said exposure station.

11. An apparatus as claimed in claim 1, wherein said view window and said contrast providing means are located at a position such that the particular frame is a frame other than a frame located at said exposure station.

* * * * *